(12) United States Patent
Krishnan et al.

(10) Patent No.: US 12,169,808 B2
(45) Date of Patent: Dec. 17, 2024

(54) SYSTEM AND METHOD FOR PREDICTIVE PRODUCT QUALITY ASSESSMENT

(71) Applicant: The Boeing Company, Chicago, IL (US)

(72) Inventors: Aravindan Krishnan, Bangalore (IN); Seema Chopra, Bangalore (IN); Kirk A. Hoeppner, Everett, WA (US)

(73) Assignee: The Boeing Company, Arlington, VA (US)

( * ) Notice: Subject to any disclaimer, the term of this patent is extended or adjusted under 35 U.S.C. 154(b) by 133 days.

(21) Appl. No.: 17/662,984

(22) Filed: May 11, 2022

(65) Prior Publication Data
US 2023/0368115 A1    Nov. 16, 2023

(51) Int. Cl.
*G06Q 10/00*      (2023.01)
*G06Q 10/0639*    (2023.01)

(52) U.S. Cl.
CPC ............................. *G06Q 10/06395* (2013.01)

(58) Field of Classification Search
None
See application file for complete search history.

(56) References Cited

U.S. PATENT DOCUMENTS

| | | | | |
|---|---|---|---|---|
| 8,214,238 | B1 * | 7/2012 | Fairfield | G06Q 30/0203 705/7.29 |
| 10,049,583 | B2 * | 8/2018 | Salentiny | G05D 1/0061 |
| 11,704,582 | B1 * | 7/2023 | Jain | G16H 50/20 705/2 |
| 2003/0153991 | A1 * | 8/2003 | Visser | G06Q 10/10 700/83 |
| 2008/0162515 | A1 * | 7/2008 | Dovas | G06Q 10/063114 |
| 2011/0241902 | A1 * | 10/2011 | Shavit | G08G 5/0043 340/978 |
| 2013/0325763 | A1 * | 12/2013 | Cantor | G06Q 10/06312 706/12 |

(Continued)

OTHER PUBLICATIONS

CM Rowles (System integration analysis of a large commercial aircraft engine) 1999—dspace.mit.edu). (Year: 1999).*

(Continued)

*Primary Examiner* — Hafiz A Kassim
(74) *Attorney, Agent, or Firm* — Alleman Hall & Tuttle LLP

(57) ABSTRACT

A method for predictive product quality assessment comprises receiving initialization product assessment data for a plurality of products. The initialization product assessment data comprises, for each product, one or more events, and for each of the one or more events, an amount of remediation time, a reassessment status, and a recurring event status. The initialization product assessment data is used to initialize a product readiness model to determine a product readiness score based upon run-time product assessment data. The run-time product assessment data comprises, for a selected product, one or more run-time events. For each of the one or more run-time events, a run-time reassessment status and a run-time recurring event status are obtained. A total run-time remediation time, the run-time reassessment status and the run-time recurring event status are input into the product readiness model. The product readiness model is utilized to determine and output the product readiness score.

18 Claims, 8 Drawing Sheets

(56) References Cited

U.S. PATENT DOCUMENTS

| | | | |
|---|---|---|---|
| 2017/0070522 A1* | 3/2017 | Bailey | H04L 41/20 |
| 2017/0359735 A1* | 12/2017 | Jain | H04L 43/0864 |
| 2017/0372232 A1* | 12/2017 | Maughan | G06F 3/0482 |
| 2021/0241139 A1* | 8/2021 | Jain | G16H 20/40 |
| 2022/0164698 A1* | 5/2022 | Chaudhary | G06N 5/04 |
| 2023/0222009 A1* | 7/2023 | Reineke | G06F 9/54 |
| | | | 717/102 |

OTHER PUBLICATIONS

J Narkiewicz, M Żugaj, A Kopyt et al. (Aircraft status supervision system concept), Journal of Aerospace ... , 2017—ascelibrary.org (Year: 2017).*

* cited by examiner

SYSTEM AND METHOD FOR PREDICTIVE PRODUCT QUALITY ASSESSMENT

BACKGROUND

In some instances, products undergo assessments to verify functionality before delivery or operational use. For example, a new aircraft may undergo ground tests and at least one flight test before being delivered to a customer. Such product assessments can generate large amounts of data indicative of product quality and readiness for delivery or operational use.

SUMMARY

According to one aspect of the present disclosure, a method is provided for predictive product quality assessment. The method comprises, during an initialization phase, receiving initialization product assessment data for a plurality of products. The initialization product assessment data comprises, for each product of the plurality of products, one or more events, and for each of the one or more events, an amount of remediation time associated with the event, a reassessment status, and a recurring event status. The initialization product assessment data is used to initialize a product readiness model to determine a product readiness score based upon run-time product assessment data.

During a run-time phase, the run-time product assessment data is received. The run-time product assessment data comprises, for a selected product, one or more run-time events. For each of the one or more run-time events, a run-time reassessment status and a run-time recurring event status are obtained. A run-time remediation time is determined for each of the one or more run-time events based upon historic remediation data. A total run-time remediation time for the selected product, the run-time reassessment status and the run-time recurring event status are input into the product readiness model. The product readiness model is utilized to determine and output the product readiness score of the selected product.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

The features, functions, and advantages that have been discussed can be achieved independently in various embodiments or can be combined in yet other embodiments, further details of which can be seen with reference to the following description and drawings.

DETAILED DESCRIPTION

Figure 1:
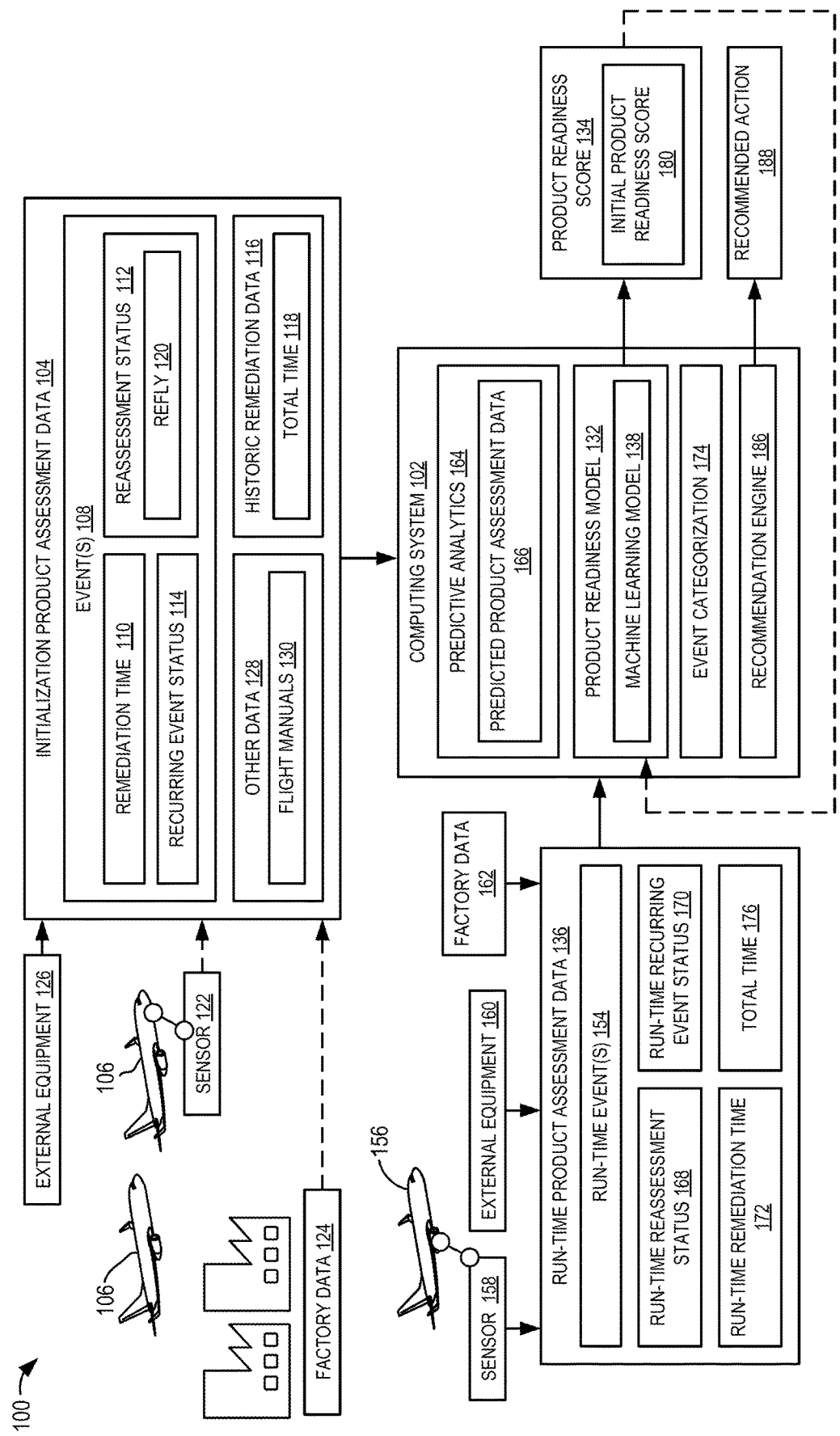
FIG. 1 shows a block diagram of an example system for predictive product quality assessment.

Products can undergo assessments to verify functionality prior to delivery or operational use. For example, a new aircraft may be subjected to ground tests and at least one flight test before the aircraft is delivered to a customer. Such product assessments can generate large amounts of data, which is indicative of the product's quality as well as its readiness for delivery or operational use. For example, an aircraft factory may maintain output logs from automated manufacturing equipment, a record of labor performed by humans, a list of suppliers and serial numbers for aircraft components, and a log of any challenges encountered during manufacturing (e.g., components out of tolerance, components replaced, or other rework performed). Aircraft systems, onboard sensors, and testing equipment also generate large volumes of data, such as electronic flight recorder data, software performance logs, flight management system data, and crew alerts during ground testing and/or flight testing.

However, a technical challenge exists to characterize product readiness based upon such data. For example, it can be challenging to combine data from disparate sources, such as manufacturing facilities, testing equipment, and sensors integrated with a product, and identify patterns within the data that are correlated with product assessment events, such as a reported aircraft issue (e.g., a "squawk").

Further, some events have a larger impact on product readiness than others, which can be difficult to quantify. For example, a report of a sticking throttle may be more urgent to address than a report of stained upholstery. In addition, another assessment, such as a repeated ground test and/or a repeated flight test (e.g., a refly), may be performed after repairing the throttle. More minor remedial actions, such as replacing the upholstery, can be carried out without triggering follow-up testing.

Due to this lack of information and inability to identify patterns in such vast amounts of data, in some instances, unwarranted testing and remedial actions (e.g., repairing or replacing a product component) are performed, which can be expensive and time consuming. In addition, issues observed during production and/or assessment can, in some instances, continue to occur after delivery, imparting additional costs on manufacturers and customers.

Thus, to address the above issues, examples are disclosed that relate to performing predictive product quality assessments. Briefly, initialization product assessment data is used to initialize a product readiness model to determine a product readiness score based upon run-time product assessment data. The run-time product assessment data comprises one or more run-time events for a selected product. A run-time reassessment status and a run-time recurring event status are obtained for each of the one or more run-time events, and a run-time remediation time is determined for each of the one or more run-time events based upon historic remediation data. A total run-time remediation time for the selected product, the run-time reassessment status and the run-time recurring event status are input into the product readiness model to determine and output the product readiness score of the selected product.

In this manner, the readiness of a product can be determined from product assessment data. In one potential advantage of the present disclosure, the product readiness score, in some examples, consolidates information derived from a plurality of different data sources regarding complex systems into a single score that can be easily compared with other products. Accordingly, product readiness scores highlight which products are likely to have higher costs and/or take more time to prepare for delivery than others based on any detected events during production and/or product assessment. In this manner, the product readiness scores enable efficient scheduling and prioritization of personnel and resources to remediate product events, as well as mitigation of future adverse events. In addition, the initialization or training of the product readiness model on initialization product assessment data enables the model to provide insight into potentially obfuscated events, such as a malfunction in a complex aircraft system that results in multiple seemingly unrelated crew alert messages, which are technically challenging to identify using other approaches (e.g., a checklist or a lookup table).

With reference now to FIG. 1, one example is provided of a system 100 for performing predictive product quality assessment. The system 100 includes a computing system 102. The computing system 102 comprises a processor and a memory storing instructions executable by the processor. The instructions are executable to implement the methods and processes described herein. Additional aspects of the computing system 102 are described in more detail below with reference to FIG. 7.

In some examples, the computing system 102 comprises a server computing device. In other examples, the computing system 102 comprises any other suitable computing device. Some examples of other suitable computing devices include, but are not limited to, a desktop computing device or a laptop computing device.

During an initialization phase, the computing system 102 is configured to receive initialization product assessment data 104 for a plurality of products, such as aircraft 106. In other examples, the plurality of products includes any other suitable product or system of products. Some other examples of suitable products include vehicles other than aircraft (e.g., spacecraft, automobiles, and watercraft), computing devices, and medical devices.

In some examples, and as described in more detail below, the initialization product assessment data 104 comprises empirical data collected for a plurality of products undergoing assessments. In this manner, the initialization product assessment data 104 reflects the real-world parameters of the products.

In other examples, the initialization product assessment data 104 comprises simulated data. In some instances, it is faster and cheaper to generate simulated data than to collect real-world product data, and real-world data may not be available for some products, such as legacy systems or products with performance parameters that are difficult to measure. In yet other examples, the initialization product assessment data 104 comprises a combination of real-world and simulated data. For example, simulated data can be used to augment real-world data and build a richer dataset.

The initialization product assessment data 104 comprises, for each product of the plurality of products, one or more events 108. In this manner, the initialization product assessment data 104 indicates events that have occurred, such as aircraft squawks.

As described in more detail below, the initialization product assessment data 104 also includes, for each of the one or more events 108, an amount of remediation time 110 associated with the event 108, a reassessment status 112, and a recurring event status 114. As described in more detail below, the amount of remediation time 110, the reassessment status 112, and the recurring event status 114 indicate the impact of each event 108 on the readiness of the product for delivery or operational use. Furthermore, the combination of the amount of remediation time 110, the reassessment status 112, and the recurring event status 114 provides a more accurate description of the product than the use of any one or two of these features.

The amount of remediation time 110 indicates the temporal impact of a selected event. In some examples, the amount of remediation time 110 is driven by engineering resolution time, operational fix time, and/or a combination thereof. The engineering resolution time includes an amount of time spent reviewing the selected event to determine if the event is expected under normal operating conditions or if the event represents an anomaly. If the event represents an anomaly, the engineering resolution time also includes investigating and recommending one or more remedial actions to address the selected event. The operations fix time includes an amount of time spent executing the one or more remedial actions.

In some examples, the amount of remediation time 110 for a selected event is estimated by averaging remediation times for past events stored in historic remediation data 116. The average remediation time provides a baseline estimate of the temporal impact of a selected event. The historic remediation data 116 additionally or alternatively indicates a total amount of remediation time 118 for a selected product, which is the sum of the remediation time 110 for all events 108 reported for that product. The total remediation time 118 provides a baseline estimate for how much time it may take to prepare another product for delivery or use.

As introduced above, the remediation time 110 alone is not a reliable indicator of the cost of an event 108. For example, some events may take less time to address than others, but trigger a potentially expensive and time-consuming reassessment. The reassessment status 112 indicates whether a selected event 108 is likely to trigger an additional product assessment.

In some examples, where the product is an aircraft 106, the reassessment status 112 comprises a refly status 120. The refly status 120 indicates whether a remedial course of action for a selected event includes an additional test flight. In some examples, the refly status 120 indicates whether a selected event triggered a refly for another selected product in the historical remediation data 116. In other examples, the refly status is determined by referencing a lookup table that specifies one or more events that trigger a refly. In yet other examples, and as described in more detail below, the refly status is output by an artificial intelligence (AI) model. In this manner, the reassessment status 112 allows the computing system to account for the potential added time and expense of an additional assessment.

Another factor that impacts the readiness of the selected product is the likelihood of an event recurring. An event that recurs after remediation attempts during production and/or assessment can, in some instances, recur again after delivery, imparting additional costs on manufacturers and customers. Accordingly, a recurring event may have a more detrimental effect on the cost and timeliness of preparing a product for delivery than a non-recurring event. The recurring event status 114 indicates the likelihood of a selected event to recur.

In some examples, the recurring event status 114 indicates whether a selected event has occurred more than once in the initialization product assessment data 104 for a selected product. In other examples, the recurring event status 114 indicates whether the selected event has occurred more than once for another selected product in the historical remediation data 116. In yet other examples, the recurring event status is determined by referencing a lookup table, or the recurring event status is output from an AI model. In this manner, the recurring event status 114 allows the computing system to account for the likelihood of the selected event to recur in another product.

In various examples, the initialization product assessment data 104 is at least partially derived from a sensor 122 located at a selected product (e.g., a sensor located in an aircraft 106), factory data 124, external product assessment equipment 126, or any combination thereof. In this manner, the initialization product assessment data 104 may reflect a broad range of metrics that can be used to assess a product.

In some examples, the initialization product assessment data 104 includes electronic flight recorder data for an aircraft 106, software performance logs, flight management system data, and/or crew alerts. Some examples of information obtainable from the sensor 122 include, but are not limited to, fuel system balance in the aircraft 106, braking performance, velocity of the aircraft 106, acceleration of the aircraft 106, altitude of the aircraft 106, and an attitude of the aircraft 106. Some examples of factory data 124 include, but are not limited to, data output from automated manufacturing equipment, a record of labor performed by humans, a list of suppliers and serial numbers for aircraft components, and/or a log of any challenges encountered during manufacturing (e.g., components out of tolerance, components replaced, and/or other rework performed).

Some examples of information obtainable from the external product assessment equipment 126 include, but are not limited to, transponder data received from the aircraft 106, a radar track of the aircraft 106, images, video, and/or weather data. In other examples, the initialization product assessment data 104 includes explicitly user-input data.

In some examples, the initialization product assessment data 104 additionally or alternatively includes other data 128. In some examples, the other data 128 includes flight manuals 130. The flight manuals 130 provide profiles of an aircraft and/or its components, as well as crew checklists. In this manner, the other data 128 provides information about components which may experience a fault or other event, as well as one or more potential remedial actions.

The initialization product assessment data 104 is used to initialize a product readiness model 132 to output a product readiness score 134 based upon run-time product assessment data 136. In some examples, the product readiness model 132 comprises a machine learning model 138. Some examples of suitable machine learning models include, but are not limited to, a decision tree classifier, a random forest classifier, a k-nearest neighbors classifier, a naïve Bayes algorithm, a gradient boosting classifier, and a support vector machine.

The machine learning model 138 is used to automatically output a product readiness score 134 based upon the run-time product assessment data 136. By using the machine learning model 138, as opposed to an explicitly programmed algorithm, rules and classifiers are produced automatically, without the potentially time-consuming process of explicitly programming the model. In addition, the machine learning model 138 is flexible to adapt to growing and/or changing datasets. Additional aspects of the product readiness model 132 are described in more detail below with reference to FIGS. 2-4.

Figure 2:
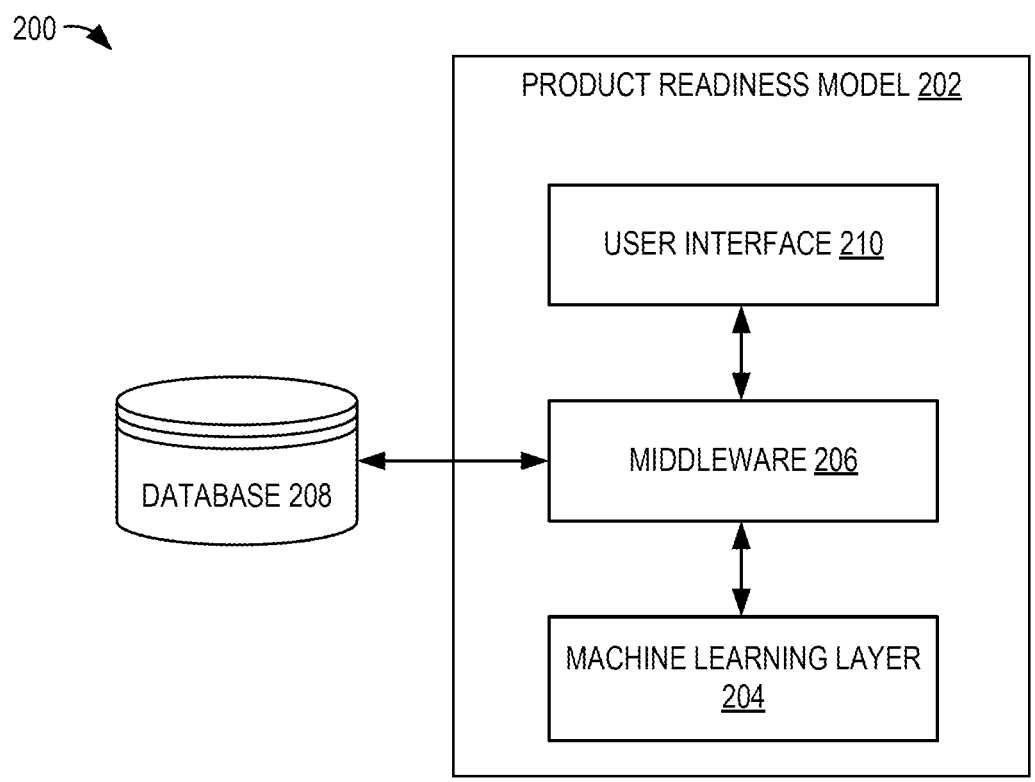
FIG. 2 shows a block diagram of an example system for implementing a product readiness model that can be used in the system of FIG. 1.

FIG. 2 shows a block diagram of an example system 200 for implementing a product readiness model 202. The product readiness model 202 can serve as the product readiness model 132 of FIG. 1. The product readiness model 202 comprises a machine learning layer 204. The machine learning layer 204 is configured to provide predictions and make assessments based upon input data. In some examples, the machine learning layer 204 comprises a framework that executes one or more machine learning models as a service. In this manner, potentially computationally expensive aspects of the machine learning layer 204 may be offloaded from a client device.

The product readiness model 202 further comprises middleware 206. The middleware 206 ingests data from one or more sources and provides the data as input to the machine learning layer 204 to execute machine learning models. In some examples, the middleware 206 comprises SPRING BOOT provided by VMWARE, INC. of PALO ALTO, CALIFORNIA.

In some examples, the middleware 206 employs command and query responsibility segregation (CQRS). CQRS separates read and update operations for a database 208, thereby preventing update commands from causing merge conflicts. In this manner, the product readiness model 202 is flexible and scalable, and avoids incurring merge conflict errors at the database level.

The database 208 serves as a source of input data and/or as a repository of machine learning model execution results. In this manner, the database 208 enables training and run-time execution of the product readiness model 202, and/or facilitates feedback training using the execution results.

The product readiness model 202 further comprises a user interface 210. The user interface 210 outputs one or more results from the product readiness model 202 to a user. Additional aspects of the user interface 210 are described in more detail below with reference to FIG. 5.

Figure 3:
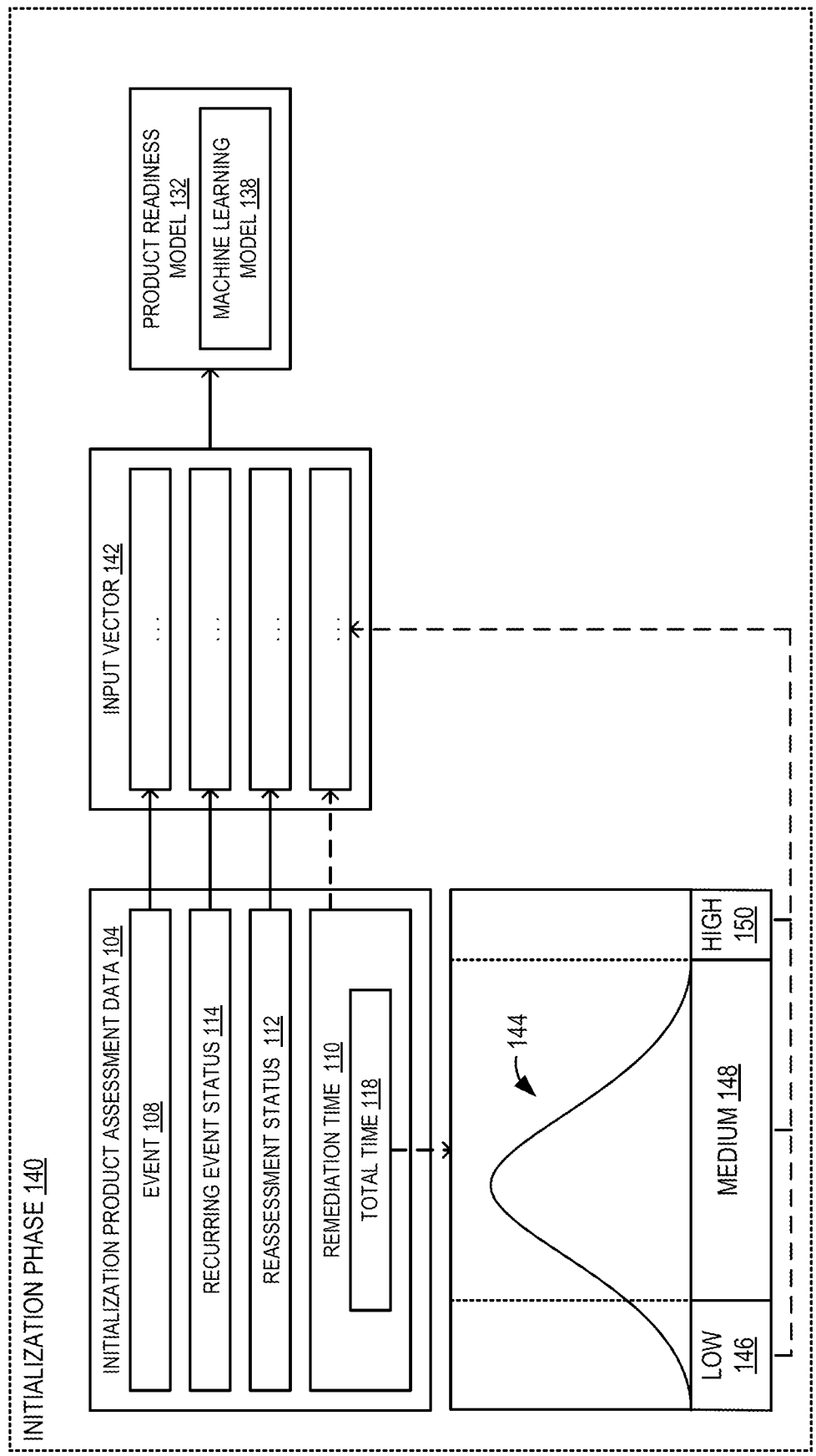
FIG. 3 shows one example of an initialization-phase implementation of the system of FIG. 1.

With reference now to FIG. 3, a schematic diagram is shown depicting an initialization-phase implementation of the product readiness model 132 of FIG. 1. The initialization product assessment data 104 is received during initialization phase 140 and used to populate an input vector 142 for the product readiness model 132.

In some examples, receiving the initialization product assessment data 104 includes obtaining the total remediation time 118 for each product of the plurality of products. FIG. 3 shows a distribution 144 of the total remediation time 118 for the plurality of products.

The distribution 144 is segmented into a plurality of data bins. In the example of FIG. 3, three data bins 146, 148, and 150 are utilized representing a low remediation time, a medium remediation time, and a high remediation time, respectively. In other examples, fewer or more than three data bins may be utilized. The distribution 144 is segmented with respect to a mean historical remediation time per product. For example, the mean historical remediation time for an aircraft may be 159 hours. Based on the distribution 144, suitable cutoff values are selected to segment the distribution 144 into the data bins 146-150. In some examples, the low remediation time data bin 146 includes total remediation time values in the range of 0 hours to half of the distribution mean. For example, where the mean is 159 hours, the low remediation time data bin 146 includes total remediation time values in the range of 0-79 hours. In some examples, the medium remediation time data bin 148

(not to scale) includes values from half of the distribution mean to twice the distribution mean. In the aforementioned example, the medium remediation time data bin 148 includes total remediation time values in the range of 80-318 hours. In some examples, the high remediation time data bin 150 includes values greater than twice the distribution mean. In the aforementioned example, the high remediation time data bin 150 includes total remediation time values greater than or equal to 319 hours.

As described in more detail below, in some examples, the initialization of the product readiness model 132 is further based upon the data bins 146-150. In some examples, the data bins 146-150 are incorporated into the input vector 142 in addition to, or as an alternative to, the remediation time 110 and/or the total time 118. For example, the input vector 142 may represent a total remediation time 118 of 40 hours as being in the low remediation time data bin 146.

In some machine-learning implementations, the initialization product assessment data 104 is used as unlabeled input to train the machine learning model 138. In this approach, also referred to as unsupervised learning, the machine learning model 138 is not provided with predetermined outputs associated with the training data. Advantageously, in some examples, the unlabeled input is faster and easier to prepare than a labeled training data set used for supervised learning. In addition, the machine learning model 138 is free to learn unlabeled patterns that may not be recognized by performing supervised training using a labeled training data set.

In other examples, the machine learning model 138 is trained using any other suitable training method. Some examples of other suitable training methods include, but are not limited to, supervised learning, semi-supervised learning (e.g., self-training), reinforcement learning, multi-task learning, ensemble learning (e.g., boosting and bagging), and instance-based learning. In this manner, users or developers have the flexibility to choose a training approach that achieves desirable results for a particular use-case scenario.

In yet other examples, in addition to or instead of a machine learning model, the product readiness model 132 comprises an explicit model, such as a user-populated lookup table. In this manner, rules used to assign the product readiness score are adjustable and the product readiness model 132 can be tuned to accurately produce a desired output. In contrast to machine learning approaches, and because the product readiness model 132 is explicitly defined, the model is readily inspected or modified. In this manner, the product readiness model 132 allows users and developers to exert a fine level of control over the product assessment process.

Figure 4:
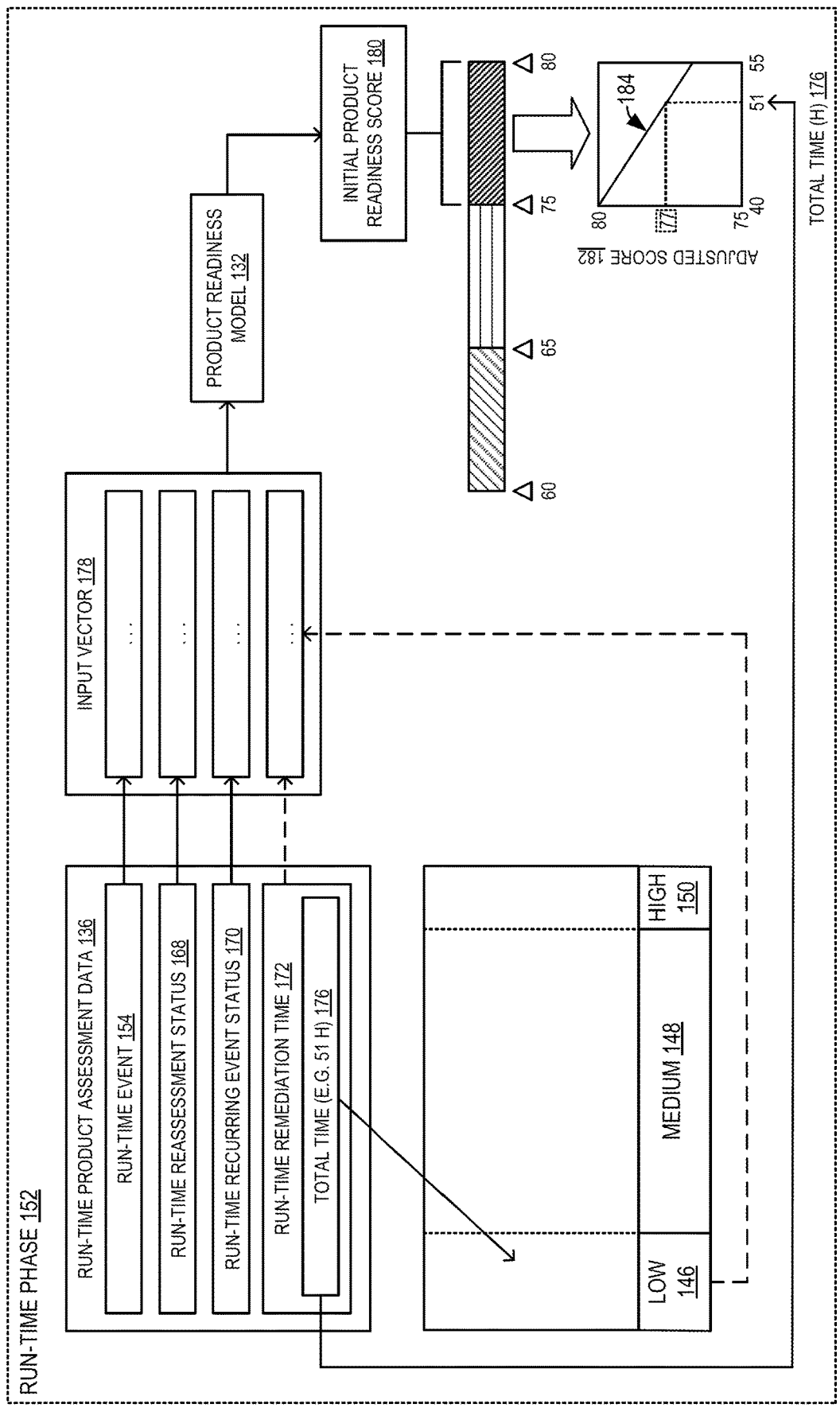
FIG. 4 shows one example of a run-time implementation of the system of FIG. 1.

With reference now to FIG. 4, a schematic diagram is shown depicting implementation of the product readiness model 132 in a run-time phase 152. In some examples, the run-time phase 152 occurs at a factory or other manufacturing facility after a product has emerged from at least a portion of the manufacturing process. The run-time phase 152 additionally or alternatively takes place during product assessment activities (e.g., taking measurements of a machined part, performing ground-based functional tests on an aircraft, or performing an aircraft flight test). It will also be appreciated that, in some examples, the product readiness model 132 runs multiple times on a selected product. For example, the product readiness model 132 may be run after an aircraft leaves its final assembly facility, after a ground test, and after a flight test. In this manner, an updated product readiness score is generated that reflects the product's status at each product assessment stage.

During the run-time phase 152, the computing system 102 of FIG. 1 is configured to receive the run-time product assessment data 136. The run-time product assessment data 136 comprises, for a selected product, one or more run-time events 154. The one or more run-time events 154 correspond to the one or more initialization-phase events 108. In some examples, the one or more run-time events 154 comprise squawks reported for an aircraft 156 undergoing run-time evaluation (e.g., a flight test).

Like the initialization product assessment data 104, in some examples, the run-time product assessment data 136 is received from a sensor 158 located at the selected product (e.g., the aircraft 156) and/or external product assessment equipment 160. In other examples, the run-time product assessment data 136 additionally or alternatively includes factory data 162.

In other examples, receiving the run-time product assessment data comprises receiving predicted product assessment data. In the example of FIG. 1, the computing system 102 comprises a predictive analytics module 164 configured to output predicted product assessment data 166, such as squawks predicted to occur for a selected aircraft before at least a portion of a product assessment has been performed. The predicted product assessment data 166 is generated based on any suitable input features. Some examples of suitable input features include, but are not limited to, component origins, an identity of a manufacturing facility, dates/times of manufacturing steps, a record of delays, and transportation details. In this manner, potential issues can be identified and addressed before performing potentially expensive product assessments (e.g., flight tests).

In other examples, the predictive analytics module 164 is implemented on at least one other computing device. In this manner, potentially computationally expensive aspects of initializing or operating the predictive analytics module 164 are offloaded from the computing system 102.

The computing system 102 is further configured to obtain, for each of the one or more run-time events 154, a run-time reassessment status 168 and a run-time recurring event status 170. The run-time reassessment status 168 corresponds to the initialization-phase reassessment status 112, and the run-time recurring event status 170 corresponds to the initialization-phase recurring event status 114.

The run-time reassessment status 168 and the run-time recurring event status 170 are obtained in any suitable manner. In some examples, the run-time reassessment status 168 indicates whether a selected event triggered an additional assessment in the historical remediation data 116. In other examples, the run-time reassessment status 168 is determined by referencing a lookup table or the run-time reassessment status 168 is output by an AI model. Similarly, in some examples, the run-time recurring event status 170 indicates whether a selected event has occurred more than once in the run-time product assessment data or for another selected product in the historical remediation data 116. In other examples, the recurring event status is determined by referencing a lookup table, or the recurring event status is output from an AI model.

A run-time remediation time 172 is also determined for each of the one or more run-time events 154 based upon historic remediation data 116. In some examples, the run-time remediation time 172 for a selected run-time event is determined by classifying the selected run-time event using an event categorization module 174. In the example of FIG. 1, the event categorization module 174 is implemented at the computing system 102. In this manner, the event categorization module 174 is configured to receive the run-time product assessment data 136 and integrate its outputs with a data flow of the product readiness model 132.

In other examples, the event categorization module 174 is implemented at another computing system independent of the product readiness model 132. In this manner, potentially computationally expensive aspects of training and/or implementing the event categorization module 174 are offloaded from the computing system 102.

The event categorization module 174 is configured to classify each of the one or more run-time events 154 into a category. For example, a report of tape on top of an aircraft wing is classified as "foreign object debris (FOD)". As another example, a report of "multiple bubbles (greater than 1 inch in diameter)" in galley mats is classified as "galley mat bubbling". In this manner, the event categorization module 174 provides a general indication of one or more types of events that occur at run-time.

In some examples, each category of events is associated with a remediation time, such as an average remediation time for events within that category. The average remediation time is determined, for example, by classifying events in the historic remediation data 116. In this manner, the average remediation time for a category serves as a general estimate of the run-time remediation time 172 for a run-time event 154 within that category.

A total run-time remediation time 176 is computed for the selected product. The total run-time remediation time 176 is a sum of the run-time remediation time 172 for all of the one or more run-time events 154.

With reference also to FIG. 4, the total run-time remediation time 176, the run-time reassessment status 168, and the run-time recurring event status 170 are input into the product readiness model 132, which is utilized to output the product readiness score 134 of the selected product (in the example of FIG. 4 and as described further below, the product readiness score 134 output from the product readiness model 132 serves as an initial product readiness score 180). As introduced above, the product readiness score 134 conceptualizes an amount of time and/or expense involved in preparing the selected product for delivery and/or operational use. In addition, combining the total run-time remediation time 176 with the run-time reassessment status 168 and the run-time recurring event status 170 provides an accurate evaluation of the selected product.

The total run-time remediation time value 176 is used to populate a run-time input vector 178 for the product readiness model 132. In this manner, the input vector 178 reflects the total run-time remediation time 176 for a selected run-time product.

In some examples, inputting the total run-time remediation time 176 for the selected product into the product readiness model 132 comprises identifying a data bin corresponding to the total run-time remediation time 176 for the selected product. In the example depicted in FIG. 4, the total run-time remediation time 176 is 51 hours, which corresponds to the low remediation time data bin 146. The identified data bin (e.g., the data bin 146) is then input into the product readiness model. Generalizing the total remediation time into the data bin reduces a number of variables accounted for in the model relative to a potential range of actual numerical values, potentially reducing the computational expense of initializing the product readiness model 132 and utilizing the product readiness model 132 at run-time.

With reference again to FIG. 1, the product readiness model 132 outputs the product readiness score 134 based upon the run-time product assessment data. In some examples, the product readiness score 134 comprises a single score (e.g., 77). In this manner, the product readiness score 134 serves as a concise summary of the run-time product assessment data. In other examples, as described in more detail below with reference to table 1 and FIG. 4, the product readiness score 134 comprises a range of scores, such as 60-80. In this manner, the product readiness score 134 serves as a general representation of the product's readiness or quality for delivery.

Table 1 shows an example of a product readiness model 132 in the form of a lookup table. The product readiness model 132 is initialized based upon the initialization product assessment data 104 as described above to output a range of product readiness scores for a product based upon the run-time reassessment status 168, the run-time recurring event status 170, and the total run-time remediation time 176.

TABLE 1

| Product Readiness Scores (range = 40-100) | | | | |
|---|---|---|---|---|
| Run-time reassessment status (168) | Run-time recurring event status (170) | Low remediation time (146) | Medium remediation time (148) | High remediation time (150) |
| No | No | 95-100 | 85-95 | 80-85 |
| Yes | No | 75-80 | 65-75 | 60-65 |
| Yes | Yes | 55-60 | 45-55 | 40-45 |

In the example of Table 1, a product with a low remediation time, no recurring events, and a positive reassessment status ("yes") has a product readiness score range of 75-80.

In some examples, and with reference now to FIG. 4, the product readiness score 134 output from the product readiness model 132 serves as an initial product readiness score 180. In some examples, the initial product readiness score is determined using a coarse product readiness model, which may occupy less memory and demand lower computational expense to train and execute than a more precise product readiness model. The initial product readiness score output by the model is then adjusted to yield an adjusted product readiness score 182.

In the example of FIG. 4, the initial product readiness score 180 comprises a range of 75-80. An interpolation function 184 is used to identify an integer score within this range as the adjusted product readiness score 182. The interpolation function 184 is a linear function of the total time 176 from 40 to 55 hours. For a total time value of 51 hours, the adjusted product readiness score is 77.

In other examples, the interpolation function 184 comprises any other suitable function. Some examples of other suitable interpolation functions include, but are not limited to, polynomial functions, exponential functions, and logarithmic functions. In yet other examples, different interpolation functions are used in different ranges of initial product readiness scores. For example, a linear function may be used for an initial product readiness score range of 75-80 and a logarithmic function may be used for an initial product readiness score range of 60-65. In this manner, an interpolation function can be selected that accurately approximates the relationship between the total remediation time and the product readiness score.

In some examples, the interpolation function 184 is computationally implemented by calculating a penalty score based on the total run-time remediation time and the initial product readiness score of the selected product. In the present example, the initial product readiness score range is 75-80. A gradient is calculated using the range of total remediation time 176 in the low remediation time data bin 146 (e.g., 0-79 hours) with respect to the range of possible scores (75-80) according to equation (1):

$$\text{Gradient} = \frac{T_{high} - T_{low}}{S_{high} - S_{low}} \quad (1)$$

In equation (1), $T_{high}$ represents the maximum time cutoff of the low remediation time data bin 146 (e.g., 79 hours), $T_{low}$ represents the minimum time cutoff of the low remediation time data bin 146 (e.g., 0 hours), $S_{high}$ represents the maximum possible score in the initial product readiness score range (e.g., 80), and $S_{low}$ represents the minimum possible score in the initial product readiness score range (e.g., 75). In the present example, the gradient is 16.

The penalty score is calculated by dividing the remediation time (e.g., 51 hours) by the gradient (e.g., 16). In the present example, the penalty score is 3. The penalty score is then subtracted from the maximum possible score in the initial product readiness score range (e.g., 80) to thereby output the adjusted product readiness score (e.g., 77). Accordingly, and in one potential advantage of the present disclosure, the adjusted product readiness score can be interpolated using standard arithmetic, which may be faster and less computationally expensive than using other functions.

In some examples, the product readiness model 132 is updated based on the run-time product assessment data 136. In some examples of machine learning implementations, the machine learning model 138 comprises a continual machine learning model that adapts to the incoming run-time product assessment data 136.

In other examples, and as indicated in FIG. 1, feedback training is performed using the product readiness score 134. In some examples, the feedback training additionally or alternatively includes feedback on one or more additional or alternative run-time events identified, a real-world remediation time, and/or a remedial action performed in response to the one or more run-time events. In this manner, the product readiness model may be adjusted to output an accurate prediction of the product readiness score that reflects real-world conditions.

Figure 5:
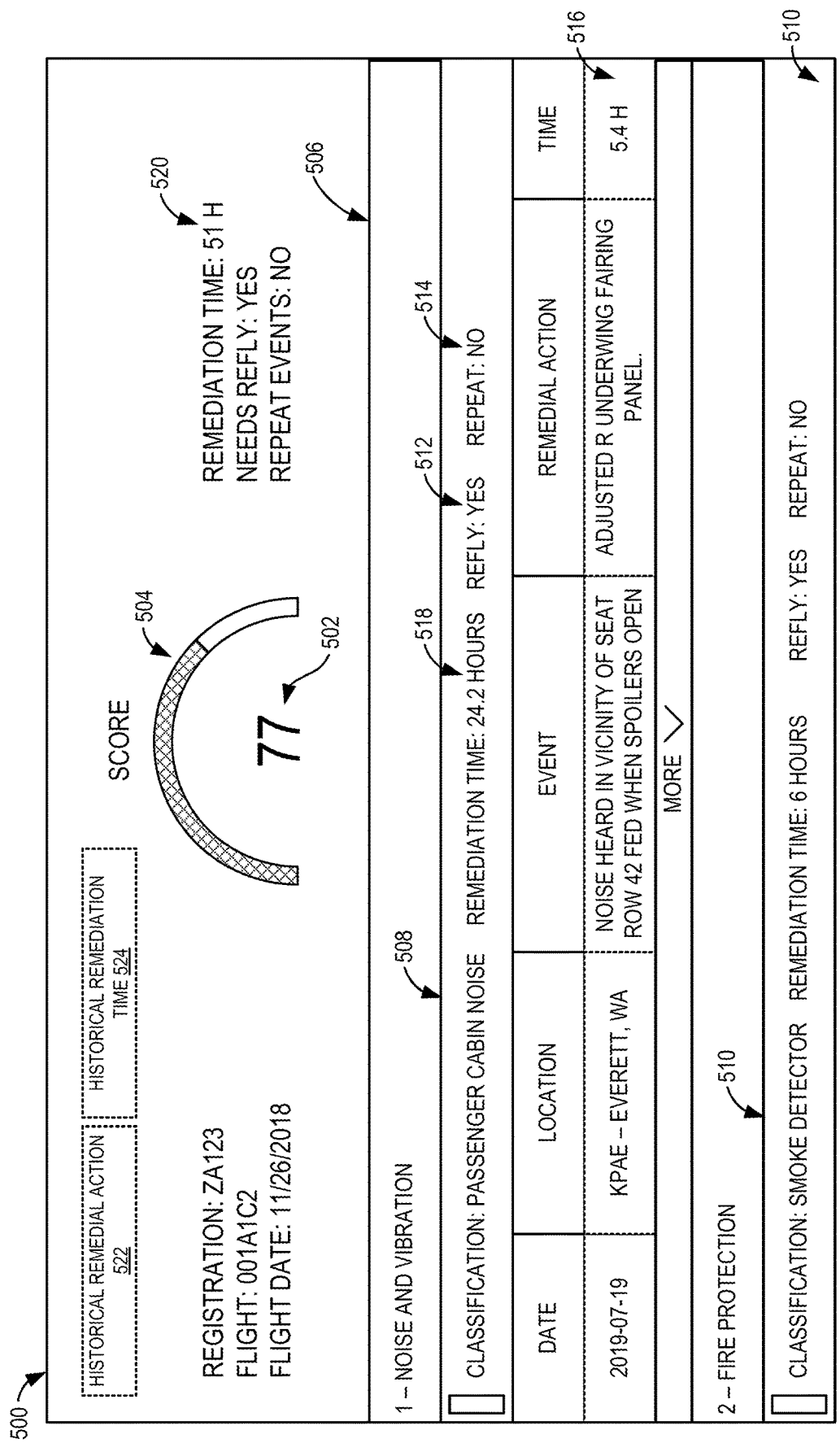
FIG. 5 shows an example of a graphical user interface (GUI) that can be used with the example system of FIG. 1.

In some examples, utilizing the product readiness model 132 to output the product readiness score 134 of the selected product comprises outputting a graphical user interface (GUI). FIG. 5 shows an example of a GUI 500 for depicting a product readiness score 502. In some examples, the product readiness score 502 is additionally or alternatively depicted in an infographic gauge element 504. The infographic gauge element 504 depicts the product readiness score 502 (e.g., 77) as a fraction of a possible score range (e.g., 0-100). In this manner, the GUI 500 is configured to output the score 502 to a user.

The GUI 500 also depicts one or more run-time events 506. In some examples, the one or more run-time events 506 are displayed in the GUI under menus 508 and 510 that aggregate the one or more run-time events 506 based upon their respective classifications. For example, one or more reports of noise inside the aircraft are classified under "passenger cabin noise" at 508. In this manner, the one or more run-time events 506 are made available and organized for the user to inspect.

For each of the one or more run-time events 506, the GUI 500 includes a run-time reassessment status 512 (e.g., "REFLY: YES"), a run-time recurring event status 514 (e.g., "REPEAT: NO"), and a run-time remediation time 516 (e.g., 5.4 hours). In some examples, the GUI 500 also includes an aggregate remediation time 518 for each category of run-time events. For example, the events categorized as "PASSENGER CABIN NOISE" have an aggregate remediation time 518 of 24.2 hours. The GUI 500 further includes a total remediation time 520 for a selected product (e.g., 51 hours). In this manner, the GUI 500 provides the user with a detailed representation of the run-time product assessment data for inspection.

In some examples, a historical remediation time and a historical remedial action are output for each of the one or more run-time events. For example, the GUI 500 additionally or alternatively includes a historical remedial action 522 and a historical remediation time 524. In this manner, the GUI 500 can serve as a troubleshooting aid and provide a reference point for potential remedial action.

In other examples, and with reference again to FIG. 1, a recommendation engine 186 is utilized to output a recommended remedial action 188 for each of the one or more run-time events. In some examples, the recommendation engine 186 comprises a machine learning model trained on the historic remediation data 116 to output the recommended remedial action 188 based upon the run-time product assessment data 136. The recommended remedial action 188 comprises any suitable remedial action. Some examples of suitable actions include, but are not limited to, repairs and part replacements. In this manner, the system 100 is configured to recommend one or more actions to address the one or more run-time events.

Figure 6A:
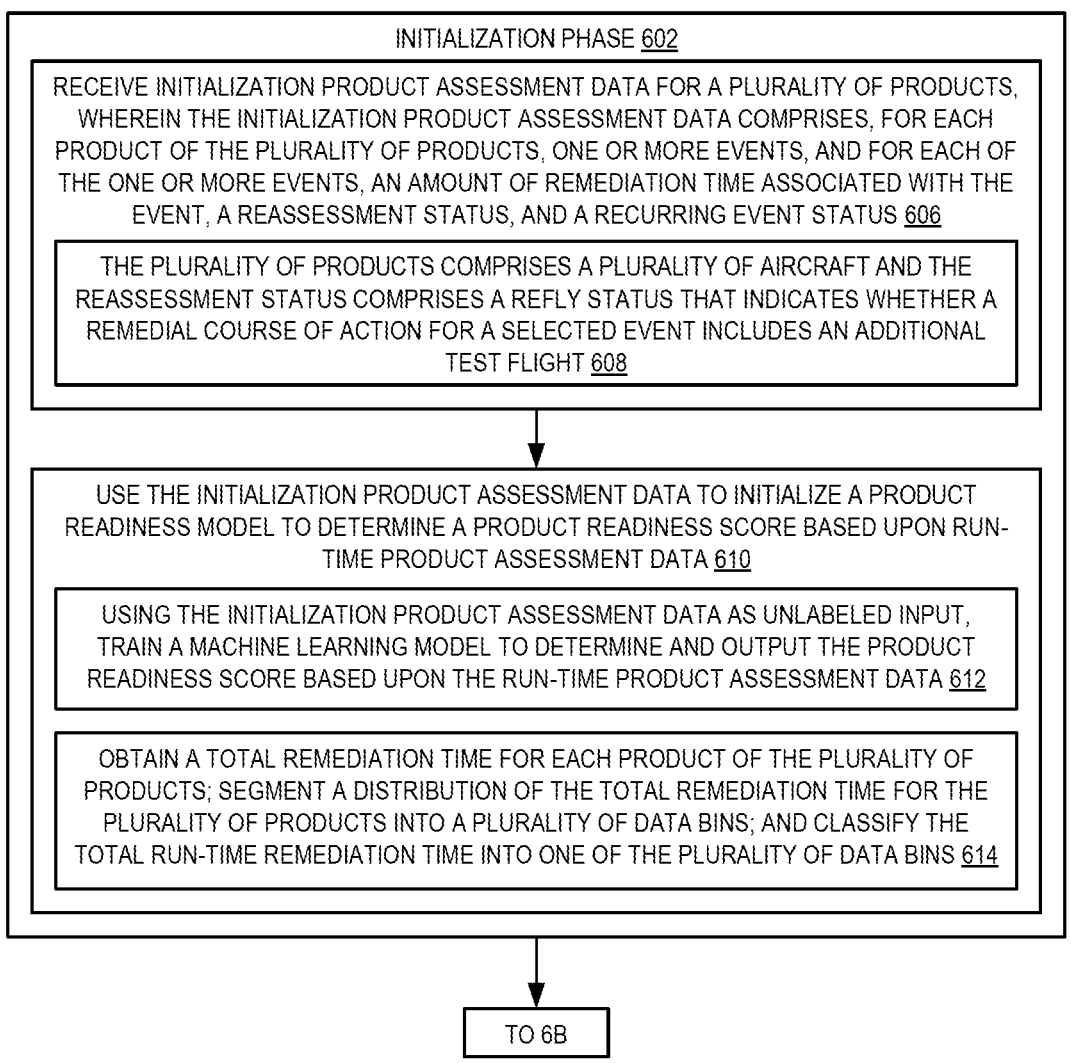
FIGS. 6A-6B show a block diagram of an example method for predictive product quality assessment.
Figure 6B:
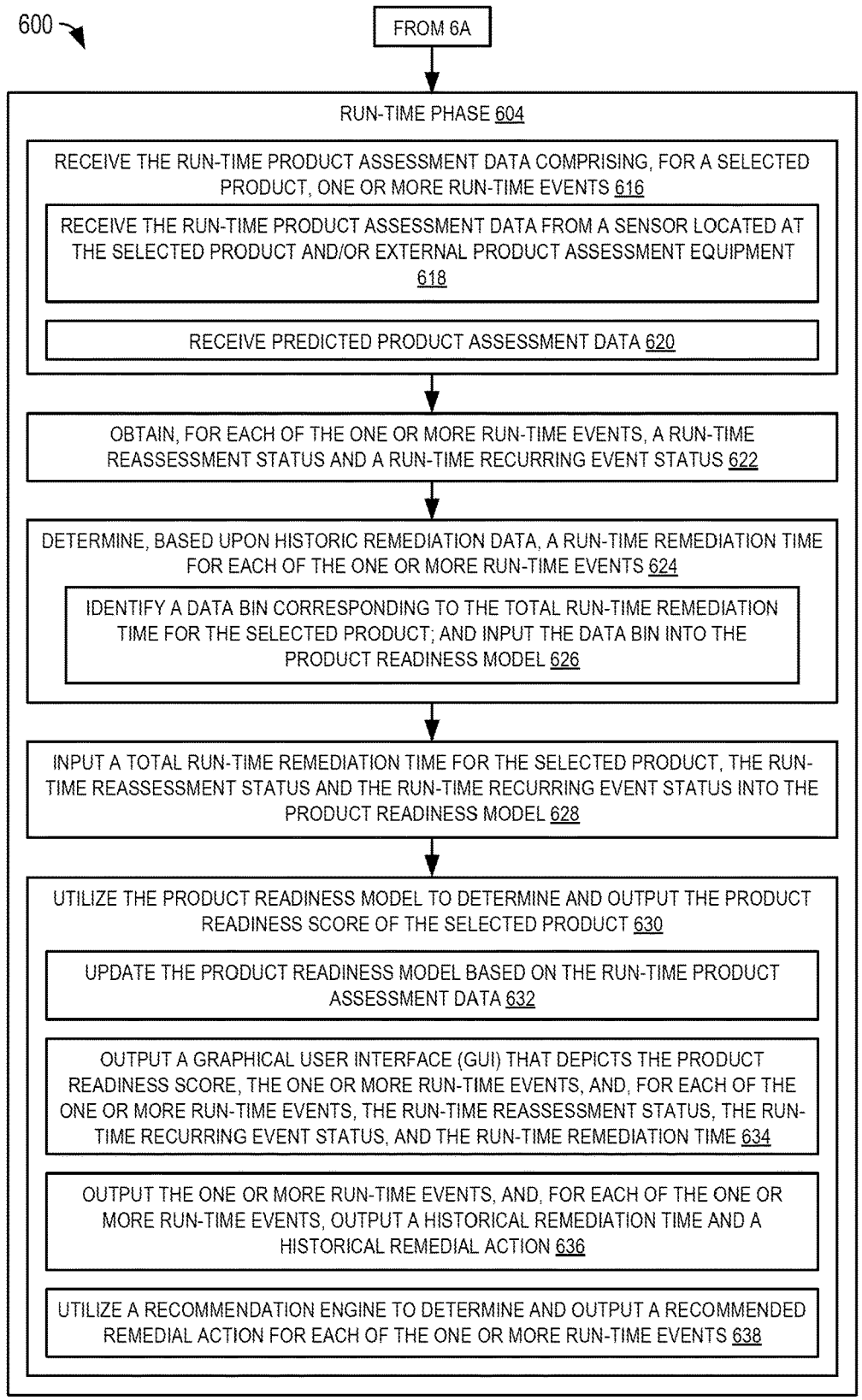

With reference now to FIGS. 6A-6B, a flowchart is illustrated depicting an example method 600 for predictive product quality assessment. The following description of method 600 is provided with reference to the software and hardware components described above and shown in FIGS. 1-5 and 7, and the method steps in method 600 will be described with reference to corresponding portions of FIGS. 1-5 and 7 below. It will be appreciated that method 600 also may be performed in other contexts using other suitable hardware and software components.

It will be appreciated that the following description of method 600 is provided by way of example and is not meant to be limiting. It will be understood that various steps of method 600 can be omitted or performed in a different order than described, and that the method 600 can include additional and/or alternative steps relative to those illustrated in FIGS. 6A and 6B without departing from the scope of this disclosure.

The method 600 includes steps performed at a training time (initialization phase) 602, illustrated in FIG. 6A, and a runtime 604, illustrated in FIG. 6B. In some examples, the steps performed at the training time 602 occur in a training environment and the steps performed at runtime 604 occur in a deployed run-time environment. In other examples, at least a portion of the steps performed at the training time 602 and runtime 604 may occur concurrently or in the same environment.

At 606 of FIG. 6A, the method 600 includes receiving initialization product assessment data for a plurality of products. The initialization product assessment data comprises, for each product of the plurality of products, one or more events, and for each of the one or more events, an amount of remediation time associated with the event, a reassessment status, and a recurring event status. For example, the computing system 102 of FIG. 1 receives initialization product assessment data 104 comprising the one or more events 108, the remediation time 110, the reassessment status 112, and the recurring event status 114. The amount of remediation time, the reassessment status, and the recurring event status indicate the impact of each event on the readiness of the product for delivery or operational use, and the combination of these features provides a more accurate description of the product than the use of any one or two of these features.

In some examples, at 608, the plurality of products comprises a plurality of aircraft and the reassessment status comprises a refly status that indicates whether a remedial course of action for a selected event includes an additional test flight. In some examples, the plurality of products comprises the aircraft 106 of FIG. 1, and the reassessment status 112 of FIG. 1 comprises the refly status 120.

At 610, the method 600 includes using the initialization product assessment data to initialize a product readiness model to determine a product readiness score based upon run-time product assessment data. For example, the initialization product assessment data 104 of FIG. 1 is used to initialize the product readiness model 132 to output the product readiness score 134 in response to receiving the run-time product assessment data 136. In this manner, the product readiness model is configured to output the product readiness score.

In some examples, at 612, initializing the product readiness model comprises, using the initialization product assessment data as unlabeled input, training a machine learning model to determine and output the product readiness score based upon the run-time product assessment data. For example, the initialization product assessment data 104 is used to train the machine learning model 138. Advantageously, in some examples, unlabeled input is faster and easier to prepare than a labeled training data set, and allows the machine learning model to learn unlabeled patterns that may not be recognized by performing supervised training using a labeled training data set.

In some examples, at 614, the method 600 includes, during the initialization phase 602, obtaining a total remediation time for each product of the plurality of products; segmenting a distribution of the total remediation time for the plurality of products into a plurality of data bins; and wherein using the initialization product assessment data to initialize the product readiness model includes configuring the product readiness model to classify the total run-time remediation time into one of the plurality of data bins. In the example of FIG. 3, the distribution 144 is segmented into data bins 146-150, which are used to generalize the total run-time remediation time 176 as shown in FIG. 4. Accordingly, and in one potential advantage of the present disclosure, generalizing the total remediation time into the data bins reduces a number of variables accounted for in the model relative to a potential range of actual numerical values.

With reference now to FIG. 6B, at 616, the method 600 includes, during the run-time phase 604, receiving the run-time product assessment data comprising, for a selected product, one or more run-time events. For example, the computing system 102 of FIG. 1 is configured to receive the run-time product assessment data 136.

In some examples, at 618, the method 600 includes receiving the run-time product assessment data from a sensor located at the selected product and/or external product assessment equipment. In some examples, the run-time product assessment data 136 of FIG. 1 is received from a sensor 158 located at the selected product (e.g., the aircraft 156) and/or external product assessment equipment 160. In this manner, the run-time product assessment data corresponds to the initialization product assessment data.

In some examples, at 620, receiving the run-time product assessment data comprises receiving predicted product assessment data. For example, the predictive analytics module 164 of FIG. 1 is configured to output predicted product assessment data 166, such as squawks predicted to occur for a selected aircraft before at least a portion of a product assessment has been performed. In this manner, potential issues can be identified and addressed before performing potentially expensive product assessments (e.g., flight tests).

At 622, the method 600 includes obtaining, for each of the one or more run-time events, a run-time reassessment status and a run-time recurring event status. For example, the computing system 102 of FIG. 1 is configured to obtain the run-time reassessment status 168 and the run-time recurring event status 170, which correspond to the initialization-phase reassessment status 112 and the initialization-phase recurring event status 114, respectively.

At 624, the method 600 includes determining, based upon historic remediation data, a run-time remediation time for each of the one or more run-time events. For example, the computing system 102 of FIG. 1 is configured to determine the run-time remediation time 172. The run-time remediation time corresponds to the initialization-phase remediation time.

In some examples, at 626, inputting the total run-time remediation time for the selected product into the product readiness model comprises: identifying a data bin corresponding to the total run-time remediation time for the selected product; and inputting the data bin into the product readiness model. For example, the total time 176 of FIG. 4 is generalized into the data bin 146, reducing a number of variables accounted for in the model relative to a potential range of actual numerical values for the total time 176.

At 628, the method 600 includes inputting a total run-time remediation time for the selected product, the run-time reassessment status and the run-time recurring event status into the product readiness model. For example, the total run-time remediation time 176, the run-time reassessment status 168, and the run-time recurring event status 170 are input into the product readiness model 132 of FIG. 1, to thereby cause the model to output the product readiness score 134. As described above, the combination of the total run-time remediation time, the run-time reassessment status, and the run-time recurring event status provides an accurate representation of the impact of a selected run-time event 154 on a product.

At 630, the method 600 includes utilizing the product readiness model to determine and output the product readiness score of the selected product. For example, the product readiness model 132 of FIG. 1 outputs the product readiness score 134. In this manner, the product readiness model is used to indicate the selected product's readiness or quality for delivery.

In some examples, at 632, the method 600 includes updating the product readiness model based on the run-time product assessment data. For example, the run-time product assessment data may be used to perform continual learning or feedback training on the machine learning model 138. Accordingly, and in one potential advantage of the present disclosure, the product readiness model adapts to the run-time product assessment data.

In some examples, at 634, the method 600 includes outputting a GUI that depicts the product readiness score, the one or more run-time events, and, for each of the one or more run-time events, the run-time reassessment status, the run-time recurring event status, and the run-time remediation time. For example, the GUI 500 depicts the product readiness score 502, the one or more run-time events 506, the run-time reassessment status 512, the run-time recurring event status 514, and the run-time remediation time 516. In this manner, the GUI 500 provides the user with a detailed representation of the run-time product assessment data.

In some examples, at 636, the method 600 includes outputting the one or more run-time events, and, for each of the one or more run-time events, outputting a historical remediation time and a historical remedial action. For example, the GUI 500 additionally or alternatively includes a historical remedial action 522 and a historical remediation time 524, which serve as a troubleshooting aid and provide a reference point for potential remedial action to address the one or more run-time events.

In some examples, at 638, the method 600 includes utilizing a recommendation engine to determine and output a recommended remedial action for each of the one or more run-time events. For example, the recommendation engine 186 of FIG. 1 is utilized to output the recommended remedial action 188 (e.g., a repair or a part replacement). In this manner, one or more actions are recommended to address the one or more run-time events.

Accordingly, the systems and methods described herein provide a simple and accurate indicator of a product's readiness for delivery or operational use. The product readiness score described above consolidates product assessment information for complex systems into a single score that represents a product status and can be easily compared with other products. Accordingly, product readiness scores may highlight which products are likely to have higher costs and/or take more time to prepare for delivery than others, enabling personnel and resources to be accurately scheduled and prioritized. In addition, the initialization or training of the product readiness model on initialization product assessment data enables the model to identify potentially obfuscated events, such as a malfunction in a complex aircraft system, which are technically challenging to identify using other approaches.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
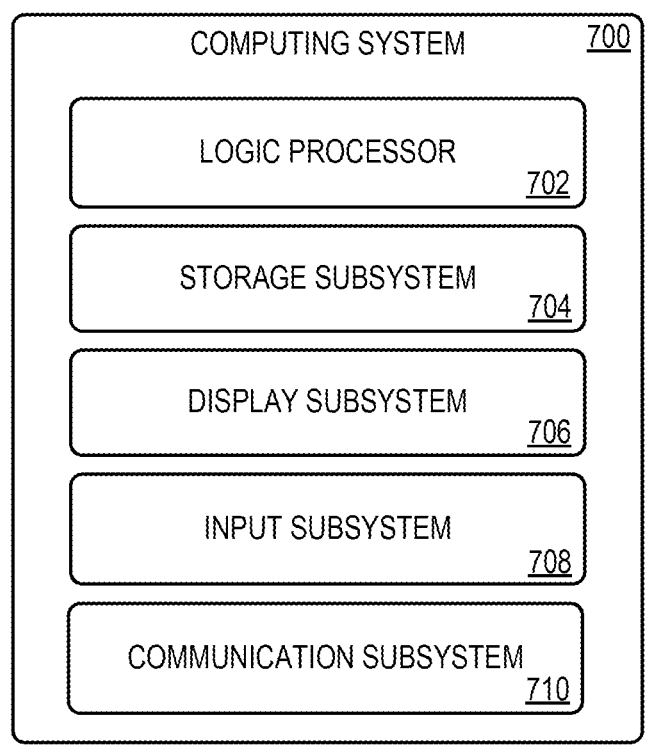
FIG. 7 shows a block diagram of an example computing system.

FIG. 7 schematically shows a non-limiting embodiment of a computing system 700 that can enact one or more of the methods and processes described above. For example, computing system 700 can be used to execute instructions to perform the method 600 of FIGS. 6A-6B and/or potentially perform other functions.

Computing system 700 is shown in simplified form. Computing system 700 may take the form of one or more personal computers, server computers, tablet computers, home-entertainment computers, network computing devices, mobile computing devices, mobile communication devices (e.g., smart phone), and/or other computing devices, and wearable computing devices such as smart wristwatches and head mounted augmented reality devices. In some examples, the computing system 102 of FIG. 1 comprises one or more aspects of the computing system 700.

Computing system 700 includes a logic subsystem 702, a storage subsystem 704, and a display subsystem 706. Computing system 700 can optionally include an input subsystem 708, a communication subsystem 710, and/or other components not shown in FIG. 7. These components are typically connected for data exchange by one or more data buses when integrated into single device, or by a combination of data buses, network data interfaces, and computer networks when integrated into separate devices connected by computer networks.

Logic subsystem 702 includes one or more physical devices configured to execute instructions. For example, logic subsystem 702 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 702 can be used to execute instructions to perform the method 600 of FIGS. 6A-6B.

Logic subsystem 702 can include one or more processors configured to execute software instructions. Additionally or alternatively, logic subsystem 702 can include one or more hardware or firmware logic machines configured to execute hardware or firmware instructions. Processors of logic subsystem 702 can be single-core or multi-core, and the instructions executed thereon can be configured for sequential, parallel, and/or distributed processing. Individual components of logic subsystem 702 optionally can be distributed among two or more separate devices, which can be remotely located and/or configured for coordinated processing. Aspects of logic subsystem 702 can be virtualized and executed by remotely accessible, networked computing devices configured in a cloud-computing configuration. In such a case, these virtualized aspects are run on different physical logic processors of various different machines, it will be understood.

Storage subsystem 704 includes one or more physical devices configured to hold instructions executable by logic subsystem 702 to implement the methods and processes described herein. For example, storage subsystem 704 can hold instructions executable to perform the method 600 of FIGS. 6A-6B, and/or potentially perform other functions. When such methods and processes are implemented, the state of storage subsystem 704 can be transformed—e.g., to hold different data.

Storage subsystem 704 can include removable and/or built-in devices. Storage subsystem 704 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 can include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SoCs, and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 can be used to present a visual representation of data held by storage subsystem 704. This visual representation can take the form of a GUI. As the herein described methods and processes change the data held by the storage subsystem 704, and thus transform the state of the storage machine, the state of display subsystem 706 can likewise be transformed to visually represent changes in the underlying data. For example, display subsystem 706 can be configured to display the GUI 500 of FIG. 5.

Display subsystem 706 can include one or more display devices utilizing virtually any type of technology. Such display devices can be combined with logic subsystem 702 and/or storage subsystem 704 in a shared enclosure, or such display devices can be peripheral display devices.

When included, input subsystem 708 can comprise or interface with one or more user-input devices such as a keyboard, mouse, touch screen, or joystick. In some embodiments, the input subsystem 708 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 708 can be configured to receive user inputs while performing the method 600 of FIGS. 6A-6B.

When included, communication subsystem 710 can be configured to communicatively couple computing system 700 with one or more other computing devices. Communication subsystem 710 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 710 can allow computing system 700 to send and/or receive messages to and/or from other devices via a network such as the Internet. For example, communication subsystem 710 can be used receive or send data to another computing system. As another example, communication subsystem may be used to communicate with other computing systems during execution of method 600 in a distributed computing environment.

Further, the disclosure comprises configurations according to the following clauses.

Clause 1. At a computing system, a method for predictive product quality assessment, the method comprising: during an initialization phase, receiving initialization product assessment data for a plurality of products, wherein the initialization product assessment data comprises, for each product of the plurality of products, one or more events, and for each of the one or more events, an amount of remediation time associated with the event, a reassessment status, and a recurring event status; and using the initialization product assessment data to initialize a product readiness model to determine a product readiness score based upon run-time product assessment data; and during a run-time phase, receiving the run-time product assessment data comprising, for a selected product, one or more run-time events; obtaining, for each of the one or more run-time events, a run-time reassessment status and a run-time recurring event status; determining, based upon historic remediation data, a run-time remediation time for each of the one or more run-time events; inputting a total run-time remediation time for the selected product, the run-time reassessment status and the run-time recurring event status into the product readiness model; and utilizing the product readiness model to determine and output the product readiness score of the selected product.

Clause 2. The method of clause 1, wherein the plurality of products comprises a plurality of aircraft and the reassessment status comprises a refly status that indicates whether a remedial course of action for a selected event includes an additional test flight.

Clause 3. The method of clause 1, wherein initializing the product readiness model comprises, using the initialization product assessment data as unlabeled input, training a machine learning model to determine and output the product readiness score based upon the run-time product assessment data.

Clause 4. The method of clause 1, further comprising updating the product readiness model based on the run-time product assessment data.

Clause 5. The method of clause 1, further comprising receiving the run-time product assessment data from a sensor located at the selected product and/or external product assessment equipment.

Clause 6. The method of clause 1, wherein receiving the run-time product assessment data comprises receiving predicted product assessment data.

Clause 7. The method of clause 1, further comprising, during the initialization phase: obtaining a total remediation time for each product of the plurality of products; segmenting a distribution of the total remediation time for the plurality of products into a plurality of data bins; and wherein using the initialization product assessment data to initialize the product readiness model includes configuring the product readiness model to classify the total run-time remediation time into one of the plurality of data bins.

Clause 8. The method of clause 7, wherein inputting the total run-time remediation time for the selected product into the product readiness model comprises: identifying a data bin corresponding to the total run-time remediation time for the selected product; and inputting the data bin into the product readiness model.

Clause 9. The method of clause 1, wherein the product readiness score comprises an initial product readiness score, the method further comprising: based on the total run-time remediation time and the initial product readiness score of the selected product, calculating a penalty score; and subtracting the penalty score from the initial product readiness score to obtain and output an adjusted product readiness score for the selected product.

Clause 10. The method of clause 1, further comprising outputting a graphical user interface (GUI) that depicts the product readiness score, the one or more run-time events, and, for each of the one or more run-time events, the run-time reassessment status, the run-time recurring event status, and the run-time remediation time.

Clause 11. The method of clause 1, further comprising outputting the one or more run-time events, and, for each of the one or more run-time events, outputting a historical remediation time and a historical remedial action.

Clause 12. The method of clause 1, further comprising utilizing a recommendation engine to determine and output a recommended remedial action for each of the one or more run-time events.

Clause 13. A computing system, comprising: a processor; and a memory storing instructions executable by the processor to, during an initialization phase, receive initialization product assessment data for a plurality of products, wherein the initialization product assessment data comprises, for each product of the plurality of products, one or more events, and for each of the one or more events, an amount of remediation time associated with the event, a reassessment status, and a recurring event status; and use the initialization product assessment data to initialize a product readiness model to determine a product readiness score based upon run-time product assessment data; and during a run-time phase, receive the run-time product assessment data comprising, for a selected product, one or more run-time events; obtain, for each of the one or more run-time events, a run-time reassessment status and a run-time recurring event status; determine, based upon historic remediation data, a run-time remediation time for each of the one or more run-time events; input a total run-time remediation time for the selected product, the run-time reassessment status and the run-time recurring event status into the product readiness model; and utilize the product readiness model to determine and output the product readiness score of the selected product.

Clause 14. The computing system of clause 13, wherein the plurality of products comprises a plurality of aircraft and the reassessment status comprises a refly status that indicates whether a remedial course of action for a selected event includes an additional test flight.

Clause 15. The computing system of clause 13, wherein the instructions executable to initialize the product readiness model are executable to use the initialization product assessment data as unlabeled input to train a machine learning model to determine and output the product readiness score based upon the run-time product assessment data.

Clause 16. The computing system of clause 13, wherein the instructions are further executable to, during the initialization phase: obtain a total remediation time for each product of the plurality of products; segment a distribution of the total remediation time for the plurality of products into a plurality of data bins; and wherein the instructions executable to use the initialization product assessment data to initialize the product readiness model include instructions executable to configure the product readiness model to classify the total run-time remediation time into one of the plurality of data bins.

Clause 17. The computing system of clause 16, wherein the instructions executable to input the total run-time remediation time for the selected product into the product readiness model comprise instructions executable to: identify a data bin corresponding to the total run-time remediation time for the selected product; and input the data bin into the product readiness model.

Clause 18. The computing system of clause 13, wherein the product readiness score comprises an initial product readiness score, and the instructions are further executable to: based on the total run-time remediation time and the initial product readiness score of the selected product, calculate a penalty score; and subtract the penalty score from the initial product readiness score to thereby output an adjusted product readiness score for the selected product.

Clause 19. The computing system of clause 13, wherein the instructions are further executable to output a graphical user interface (GUI) that depicts the product readiness score, the one or more run-time events, and, for each of the one or more run-time events, the run-time reassessment status, the run-time recurring event status, and the run-time remediation time.

Clause 20. At a computing device, a method for predictive aircraft quality assessment, the method comprising: during an initialization phase, receiving initialization aircraft assessment data for a plurality of aircraft, wherein the initialization aircraft assessment data comprises, for each aircraft of the plurality of aircraft, one or more events, and for each of the one or more events, an amount of remediation time associated with the event, a refly status that indicates whether a remedial course of action for the event includes an additional test flight, and a recurring event status; and using the initialization aircraft assessment data to initialize an aircraft readiness model to determine an aircraft readiness score based upon run-time aircraft assessment data; and during a run-time phase, receiving the run-time aircraft assessment data comprising, for a selected aircraft, one or more run-time events; obtaining, for each of the one or more run-time events, a run-time refly status and a run-time recurring event status; determining, based upon historic remediation data, a run-time remediation time for each of the one or more run-time events; inputting a total run-time remediation time for the selected aircraft, the run-time refly status and the run-time recurring event status into the aircraft readiness model; and utilizing the aircraft readiness model to determine and output the aircraft readiness score of the selected aircraft.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing system, a method for predictive product quality assessment, the method comprising:
during an initialization phase,
receiving initialization product assessment data for a plurality of products, wherein the initialization product assessment data comprises, for each product of the plurality of products,
one or more events, and
for each of the one or more events, an amount of remediation time associated with the event, a reassessment status that indicates whether the event is likely to trigger an additional product assessment, and a recurring event status; and
using the initialization product assessment data to initialize a product readiness model to determine a product readiness score based upon run-time product assessment data, wherein initializing the product readiness model comprises training a machine learning model using the initialization product assessment data as unlabeled input and using at least, for the one or more events for each product, the amount of remediation time associated with each of the one or more events, the reassessment status that indicates whether the event is likely to trigger the additional product assessment, and the recurring event status; and
during a run-time phase,
receiving the run-time product assessment data comprising, for a selected product, one or more run-time events;
obtaining, for each of the one or more run-time events, a run-time reassessment status that indicates whether the run-time event is likely to trigger an additional product assessment and a run-time recurring event status;
determining, based upon historic remediation data, a run-time remediation time for each of the one or more run-time events;
inputting a total run-time remediation time for the selected product, the run-time reassessment status and the run-time recurring event status into the product readiness model;
utilizing the trained machine learning model of the product readiness model to determine and output the product readiness score of the selected product based upon the run-time product assessment data;
performing feedback training of the trained machine learning model; and
after performing feedback training of the trained machine learning model, using the feedback trained machine learning model to output another product readiness score.

2. The method of claim 1, wherein the plurality of products comprises a plurality of aircraft and the reassessment status comprises a refly status that indicates whether a remedial course of action for a selected event includes an additional test flight.

3. The method of claim 1, further comprising updating the product readiness model based on the run-time product assessment data.

4. The method of claim 1, further comprising receiving the run-time product assessment data from a sensor located at the selected product and/or external product assessment equipment.

5. The method of claim 1, wherein receiving the run-time product assessment data comprises receiving predicted product assessment data.

6. The method of claim 1, further comprising, during the initialization phase:
obtaining a total remediation time for each product of the plurality of products;
segmenting a distribution of the total remediation time for the plurality of products into a plurality of data bins; and
wherein using the initialization product assessment data to initialize the product readiness model includes configuring the product readiness model to classify the total run-time remediation time into one of the plurality of data bins.

7. The method of claim 6, wherein inputting the total run-time remediation time for the selected product into the product readiness model comprises:
identifying a data bin corresponding to the total run-time remediation time for the selected product; and
inputting the data bin into the product readiness model.

8. The method of claim 1, wherein the product readiness score comprises an initial product readiness score, the method further comprising:
based on the total run-time remediation time and the initial product readiness score of the selected product, calculating a penalty score; and
subtracting the penalty score from the initial product readiness score to obtain and output an adjusted product readiness score for the selected product.

9. The method of claim 1, further comprising outputting a graphical user interface (GUI) that depicts the product readiness score, the one or more run-time events, and, for each of the one or more run-time events, the run-time reassessment status, the run-time recurring event status, and the run-time remediation time.

10. The method of claim 1, further comprising outputting the one or more run-time events, and, for each of the one or more run-time events, outputting a historical remediation time and a historical remedial action.

11. The method of claim 1, further comprising utilizing a recommendation engine to determine and output a recommended remedial action for each of the one or more run-time events.

12. A computing system, comprising:
a processor; and
a memory storing instructions executable by the processor to,
during an initialization phase,
receive initialization product assessment data for a plurality of products, wherein the initialization product assessment data comprises, for each product of the plurality of products,
one or more events, and
for each of the one or more events, an amount of remediation time associated with the event, a reassessment status that indicates whether the event is likely to trigger an additional product assessment, and a recurring event status; and
use the initialization product assessment data to initialize a product readiness model to determine a product readiness score based upon run-time product assessment data, wherein initializing the product readiness model comprises training a machine learning model using the initialization product assessment data as unlabeled input and using at least, for the one or more events for each product, the amount of remediation time associated with each of the one or more events, the reassessment status that indicates whether the event is likely to trigger the additional product assessment, and the recurring event status; and during a run-time phase,
receive the run-time product assessment data comprising, for a selected product, one or more run-time events;
obtain, for each of the one or more run-time events, a run-time reassessment status that indicates whether the run-time event is likely to trigger an additional product assessment and a run-time recurring event status;
determine, based upon historic remediation data, a run-time remediation time for each of the one or more run-time events;
input a total run-time remediation time for the selected product, the run-time reassessment status and the run-time recurring event status into the product readiness model;
utilize the trained machine learning model of the product readiness model to determine and output the product readiness score of the selected product based upon the run-time product assessment data;
perform feedback training of the trained machine learning model; and
after performing feedback training of the trained machine learning model, using the feedback trained machine learning model to output another product readiness score.

13. The computing system of claim 12, wherein the plurality of products comprises a plurality of aircraft and the reassessment status comprises a refly status that indicates whether a remedial course of action for a selected event includes an additional test flight.

14. The computing system of claim 12, wherein the instructions are further executable to, during the initialization phase:
obtain a total remediation time for each product of the plurality of products;
segment a distribution of the total remediation time for the plurality of products into a plurality of data bins; and
wherein the instructions executable to use the initialization product assessment data to initialize the product readiness model include instructions executable to configure the product readiness model to classify the total run-time remediation time into one of the plurality of data bins.

15. The computing system of claim 14, wherein the instructions executable to input the total run-time remediation time for the selected product into the product readiness model comprise instructions executable to:
identify a data bin corresponding to the total run-time remediation time for the selected product; and
input the data bin into the product readiness model.

16. The computing system of claim 12, wherein the product readiness score comprises an initial product readiness score, and the instructions are further executable to:
based on the total run-time remediation time and the initial product readiness score of the selected product, calculate a penalty score; and
subtract the penalty score from the initial product readiness score to thereby output an adjusted product readiness score for the selected product.

17. The computing system of claim 12, wherein the instructions are further executable to output a graphical user interface (GUI) that depicts the product readiness score, the one or more run-time events, and, for each of the one or more run-time events, the run-time reassessment status, the run-time recurring event status, and the run-time remediation time.

18. At a computing device, a method for predictive aircraft quality assessment, the method comprising:
during an initialization phase,
receiving initialization aircraft assessment data for a plurality of aircraft, wherein the initialization aircraft assessment data comprises, for each aircraft of the plurality of aircraft,
one or more events, and
for each of the one or more events, an amount of remediation time associated with the event, a refly status that indicates whether a remedial course of action for the event includes an additional test flight, and a recurring event status; and
using the initialization aircraft assessment data to initialize an aircraft readiness model to determine an aircraft readiness score based upon run-time aircraft assessment data, wherein initializing the aircraft readiness model comprises training a machine learning model using at least, for the one or more events for each product, the amount of remediation time associated with each of the one or more events, the refly status that indicates whether a remedial course of action for the event includes an additional test flight, and the recurring event status; and
during a run-time phase,
receiving the run-time aircraft assessment data comprising, for a selected aircraft, one or more run-time events;
obtaining, for each of the one or more run-time events, a run-time refly status that indicates whether a remedial course of action for the run-time event includes an additional test flight and a run-time recurring event status;
determining, based upon historic remediation data, a run-time remediation time for each of the one or more run-time events;
inputting a total run-time remediation time for the selected aircraft, the run-time refly status and the run-time recurring event status into the aircraft readiness model; and
utilizing the trained machine learning model of the aircraft readiness model to determine and output the aircraft readiness score of the selected aircraft based upon the run-time aircraft assessment data; and
performing feedback training of the trained machine learning model;
after performing feedback training of the trained machine learning model, using the feedback trained machine learning model to output another product readiness score.

* * * * *